United States Patent [19]

Nyboer

[11] Patent Number: 4,771,570

[45] Date of Patent: Sep. 20, 1988

[54] MACHINE FOR LAYING FILM ALONG A PLANTING ROW

[76] Inventor: Duane A. Nyboer, 3242 - 44th St., Hamilton, Mich. 49419

[21] Appl. No.: 947,374

[22] Filed: Dec. 29, 1986

[51] Int. Cl.⁴ ............................................. A01G 7/00
[52] U.S. Cl. ............................................. 47/9; 111/2
[58] Field of Search ............... 47/9, 19, 56; 111/2, 111/3; 242/86.52, 86.5 R; 400/611, 613; 101/228

[56] References Cited

U.S. PATENT DOCUMENTS

| | | | |
|---|---|---|---|
| 1,436,139 | 11/1922 | Bailey | 47/9 |
| 3,460,493 | 8/1969 | Stephenson et al. | 111/3 |
| 4,092,936 | 6/1978 | Griffin et al. | 111/3 |

FOREIGN PATENT DOCUMENTS 2399796  4/1979  France ............................. 242/86.52

Primary Examiner—Robert A. Hafer
Attorney, Agent, or Firm—Glenn B. Morse

[57] ABSTRACT

A machine for laying shelter film along a planting row supports the film roll at least in part on wheels disposed to press the opposite edges of the film into furrows in the ground. The film is thus carried by the wheels from the roll to the ground. A cantilever member is mounted centrally and ahead of the wheels to temporarily support the film when it is deposited over a series of arches.

7 Claims, 4 Drawing Sheets

MACHINE FOR LAYING FILM ALONG A PLANTING ROW

BACKGROUND OF THE INVENTION

The use of continuous mulch film has become common in large-scale agriculture operations. Under this procedure, the ground is initially prepared for planting, and a long strip of mulch film is laid over the planting row. Seeds are then planted through the mulch film. Another utilization of continuous film involves depositing it over a series of bent wire arches to produce a shelter tunnel for seedlings that have previously been planted. A device for depositing the film directly on the ground is shown in U.S. Pat. No. 4,513,530; and application Ser. No. 788,018 (filed on Oct. 16, 1985) covers a machine for installing the arches. These developements are owned by the assignee of the present application.

A strip of film three or four feet wide is a rather awkward material to handle as it is taken from the roll and brought down so that its edges can be interengaged with the ground. Obviously, this problem becomes even more difficult when even a moderate wind is blowing. Some difficulty has also been encountered when the film is pulled from the roll by the tension supplied from the previously-installed portions of the strip. This tension tends to disturb the engagement of the edges of the film with the ground at the point where the installation is taking place. As the wheels responsible for pressing the film edges into the ground are working to perform this function, the film tension is tending to pull the film into a straight line, and thus pull the edges out of the furrows that have been closed over them. Where film is being deposited over arches, a tendency has been noted for the film tension to pull the arches out of position during the installation. The present invention provides a simple and economical solution to these problems.

SUMMARY OF THE INVENTION

This machine supports a roll of film at least in part on wheels that carry the film to the point where the edges of it are engaged in furrows in the ground. The action of the wheels thus progressively unrolls the film at exactly the speed at which the machine is moving, and supports it firmly during the passage of the film from the roll to the ground. Where the film is deposited over a series of aligned arches, the film is temporarily supported over the installation point by a central member having the effect of lifting the film over the arches as the machine proceeds.

DESCRIPTION OF THE PREFERRED EMBODIMENTS

Figure 3:
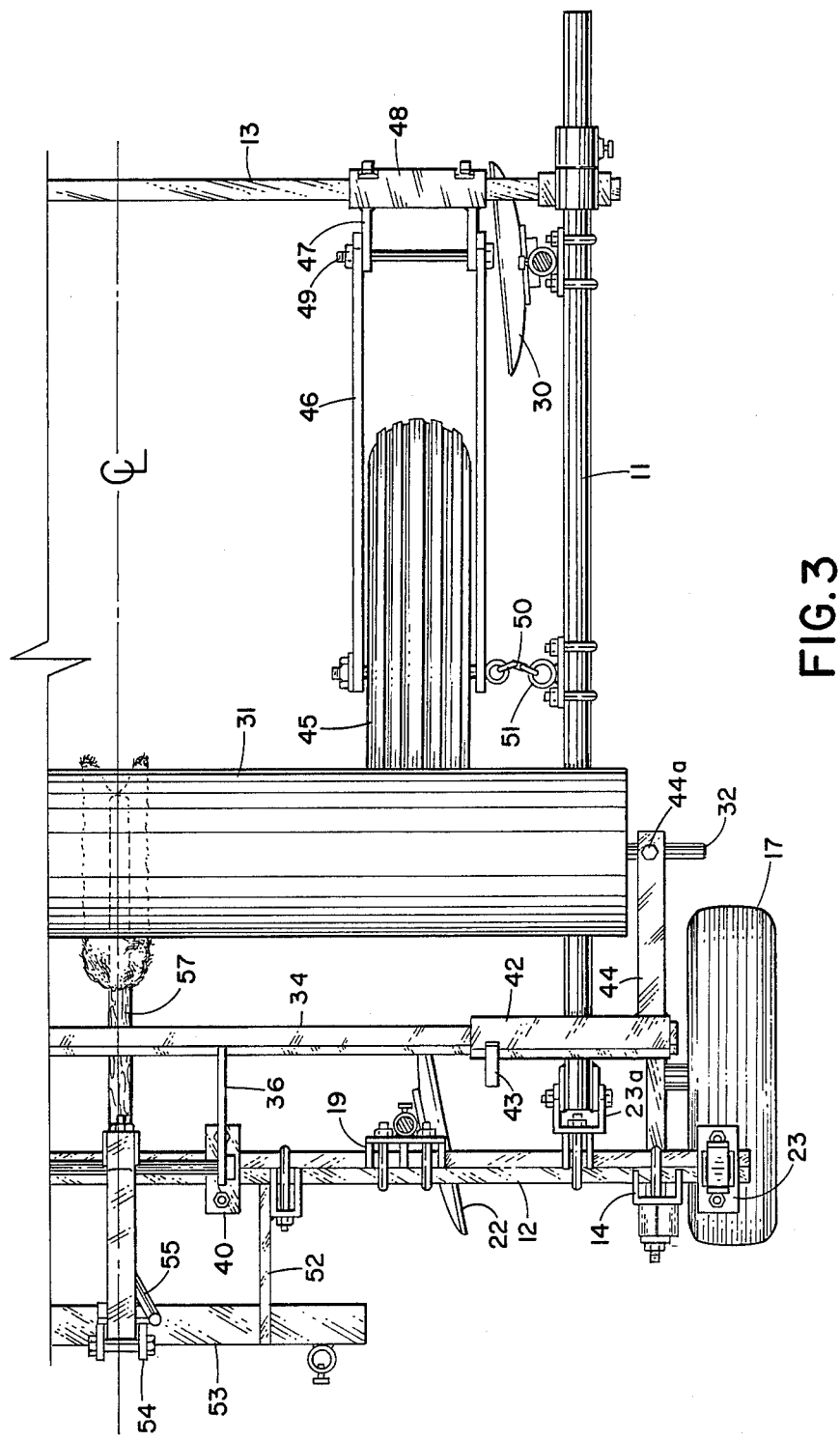
FIG. 3 is a plan view of the left side of the machine shown in FIGS. 1 and 2.

Referring to the drawings, the machine has a main frame including the side members 10 and 11, and the front and rear transverse members 12 and 13. The rear member is connected to the side members with intersection couplings as shown. The structure at the opposite sides of the vehicle is essentially the same. The frame members are tubular, the side members 10 and 11 being round, and the transverse front and rear members being square in cross section. Clamps as shown at 14 are received over the front transverse member 12, and carry the bolts 15 receiving the vertical struts 16 supporting the main ground-engaging wheels 17 and 18. A clamp 19 has a tubular receptacle 20 carrying the strut 21 supporting the disc 22 positioned to open a furrow in the ground as the machine proceeds. Clamps as shown at 23 carry the vertical columns 24 and 25 provided with the forks 26 and 27 for receiving the ends of a shaft carrying an extra roll of film in addition to the roll then being deposited. The extra roll is omitted from the drawings for clarity. The clamps 23a function as connection points for the side members 10 and 11, as best shown in FIG. 3. All of these clamps are secured in position by U-bolts as shown. Brackets as shown at 28 are located near the rear of the vehicle, and are secured to the side members of the main frame by "U" bolts for positioning the struts 29 carrying the discs 30 for closing the ground furrows after the film has been deposited.

Figure 1:
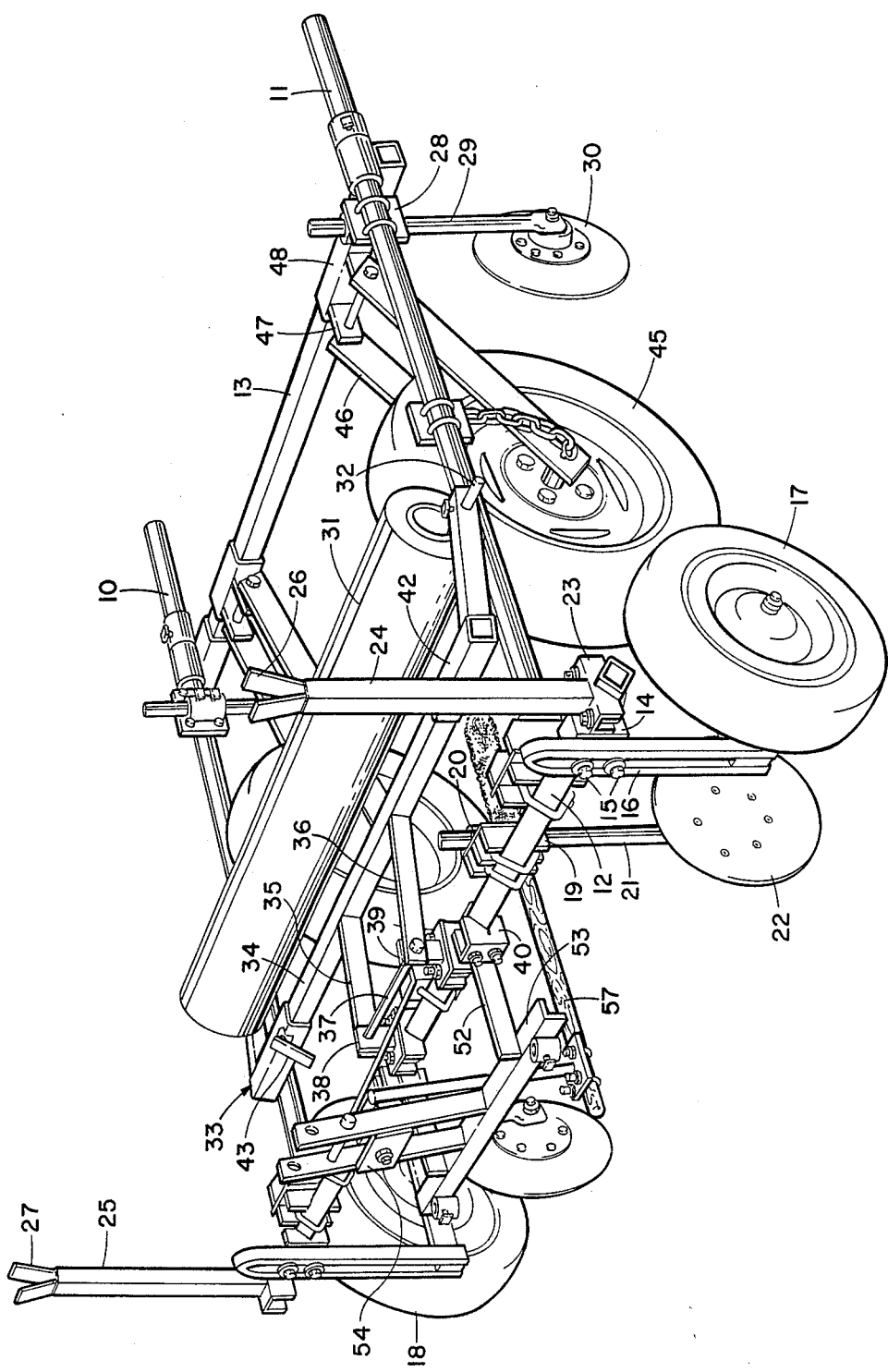
FIG. 1 is a perspective front quarter view of a machine embodying the present invention.
Figure 2:
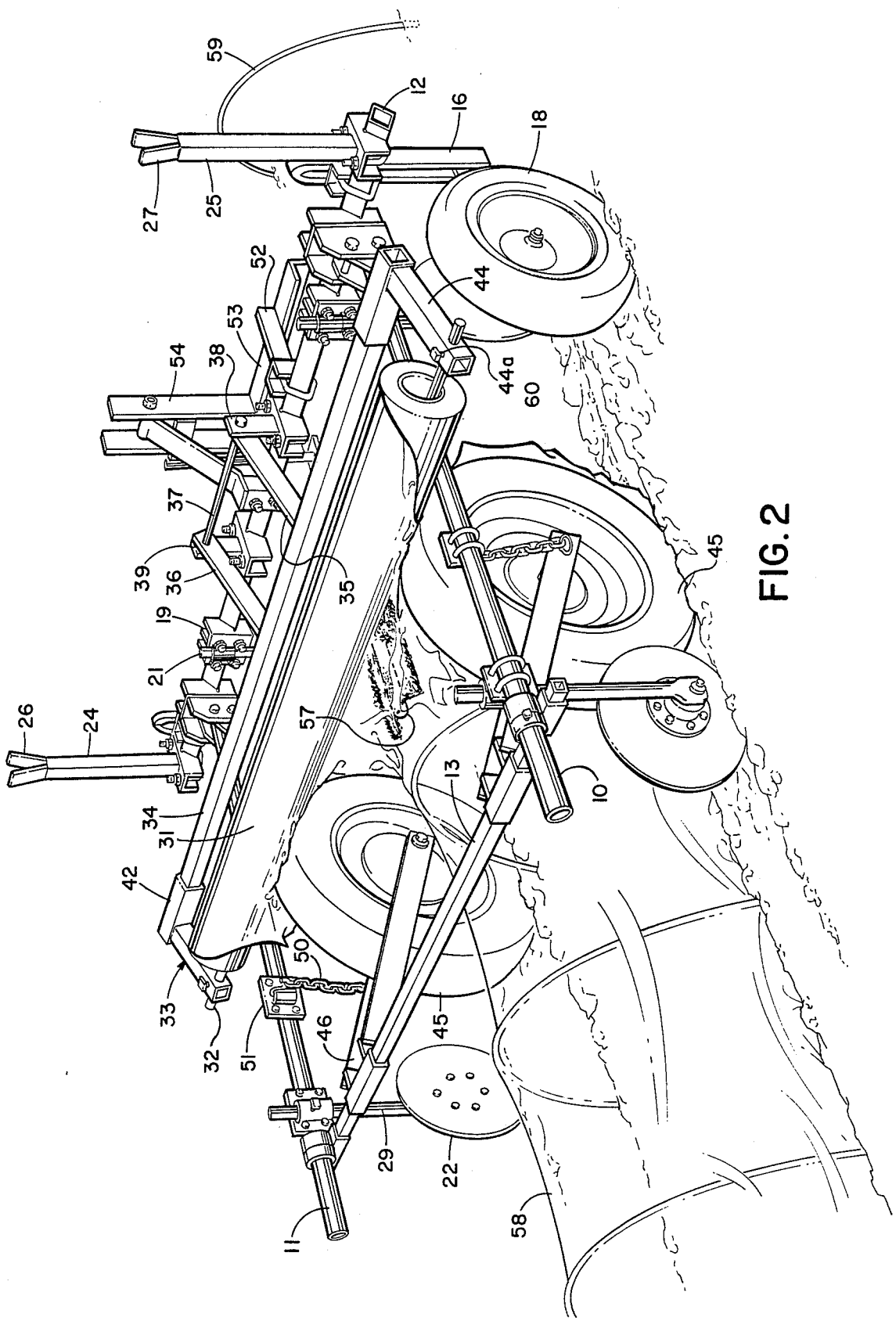
FIG. 2 is a rear quarter perspective view of the machine shown in FIG. 1, showing the action of the machine as film is deposited over a series of arches.

A roll of film 31 is carried by the shaft 32 secured temporarily to the roll frame generally indicated at 33. This frame has a transverse member 34 and the arms 35 and 36 extending forward to the pivot shaft 37 supported by the brackets 38 and 39. These brackets are mounted on clamps 40 receiving the front frame member 12. The collars 42 are telescopically received over the ends of the roll frame member 34, and are secured in position by tightening the set screw controlled by the handles 43. The collars 42 have the trailing arms 44 provided with appropriate holes for receiving the shaft 32. Set screws as shown at 44a secure the shaft in position. The result of this arrangement is the positioning of the film roll 31 in a front-rear direction by the pivotal mounting of the roll frame. The roll is supported in a vertical direction primarily as a result of resting on the periphery of the film-pressing wheels 45 which shove the edges of the film down into the furrows opened by the discs 22, and closed later over the edges of the film by the discs 30. Experience has shown that the wheels 45 should be about six inches wide at the tires, in order to hold the film down over a sufficiently wide path to assure that the inflow of dirt will be sufficient to hold the film in place. Wheels with tires of twenty-six inches in outside diameter have been found to be very effective. The film is progressively unwound from the roll and carried to the point of engagement with the ground by these wheels, as best shown in FIG. 2. The film-pressing wheels 45 are carried by the links 46 pivotally mounted on brackets 47 supported by the collars 48 engaging the rear transverse frame member 13, and held in the selected lateral position by set screws as shown in FIG. 3. A bolt 49 functions as the pivot connection between the links 46 and the brackets 47. The chains 50 extend from the links 46 to terminals as shown at 51 secured to the side frame members by "U"-bolts as shown. The function of these chains is to limit the downward swinging of the links 46 as the entire machine is elevated by the conventional hitch mechanism of a tractor to which the illustrated machine will normally be attached. The attachment structure is provided by the hitch frame which includes the side arms 52 welded to the collar 40, the frontal transverse member 53, and the vertical structure 54 secured to this transverse member. In addition to providing a point of attachment for the hitch mechanism of the tractor, the vertical structure 54 supports the rod 55 extending downward to the bracket 56 to which the perferably wooden dowel rod 57 is clamped by "U"-shaped bolts as shown. This cantilever wooden rod receives the central portion of the film strip as it is being deposited, and temporarily supports it so that it is carried over the tops of the arches shown in FIG. 2 in order to avoid pulling the arches out of place as the film is being worked into position. The rear extremity of the cantilever rod 57 is rounded to minimize any tendency to tear the film strip. Experience has established that wood seems to be a better material for avoiding damage to the film strip than metal.

Figure 4:
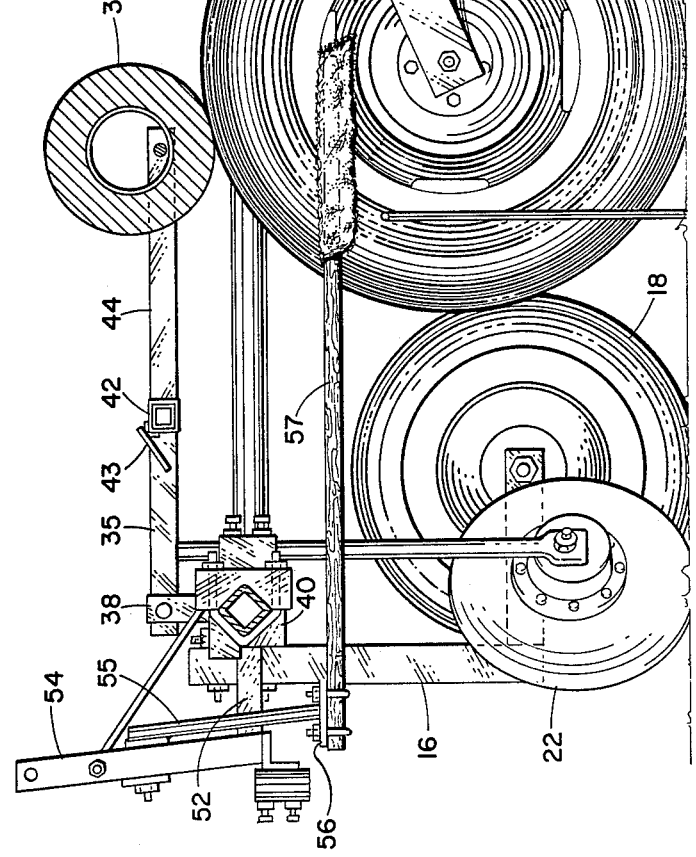
FIG. 4 is a central sectional elevation of the machine shown in FIG. 1–3.

FIG. 2 illustrates how the edge 60 of the film strip is carried by the periphery of the film-pressing wheel from the point where it is pulled clear of the roll 31, and carried down into the furrow. Referring to FIG. 4, it should be noted that the axis of the roll 31 is somewhat ahead of the axis of the film-pressing wheels 45, and the location of the pivot axis of the roll frame tends to increase the bearing pressure between the periphery of the roll 31 and the wheels 45, almost in the fashion of a toggle. This effect is increased as the diameter of the roll decreases, and the roll axis tends to approach a line of centers between the axis of the wheels 45 and that of the pivot rod 37. This distance, however, should be selected so that the minimum roll diameter should never result in permitting the roll to lower sufficiently to drag on the side members 10 and 11 of the frame.

Figure 5:
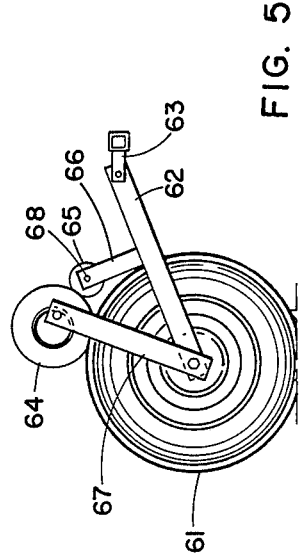
FIG. 5 illustrates a modified form of the invention.

A modified form of roll support is illustrated in FIG. 5. In this arrangement, the film-pressing wheel 61 and the link 62 are the same as the components 45 and 46 described previously. The supporting bracket structure 63 can also be identical to the indicated at 47. In this modification, however, the roll 64 is supported by the joint action of the wheel 61 and the auxiliary roller 65 carried by opposite brackets 66. Opposite arms 67 are pivoted coaxially with the wheels 61 to prevent endwise displacement of the roll 64. These arms are held in engagement with the roll by a shaft 68, and the arms 67 merely float freely with the roll 64. These arms may be laterally offset, when necessary, to avoid interference with the side members 10 and 11 of the frame when the roll overhangs these members.

I claim:

1. A machine for laying agricultural film, including a main frame, spaced film-pressing wheels mounted substantially coaxially on opposite sides of said main frame, film roll supporting means adapted to position a roll of film so that film withdrawn from said roll is engaged by said pressing wheels as said machine proceeds along a path over ground, furrow-opening means disposed ahead of and in alignment with said film-pressing wheels, said film-pressing wheels riding in furrows opened by said furrow-opening means, and furrow-closing means disposed behind said film-pressing wheels with respect to said path, wherein the improvement comprises:
    said film roll supporting means is disposed to dispense film onto the upper portion of said pressing wheels, wherein said film roll supporting means includes a roll frame having a roll shaft, said roll frame being pivotally mounted on said main frame on a pivot axis substantially parallel to the axis of said film pressing wheels, whereby said film is carried in contact with said pressing wheels from said roll to and into said furrows.

2. A machine as defined in claim 1, additionally including a film roll engaged on the film thereof by said supporting means, at least a portion of the weight of said film roll resting directly on said film-pressing wheels.

3. A machine as defined in claim 1, wherein said pivot axis is in front of and above said film-pressing wheel axis with respect to said path.

4. A machine as defined in claim 1, wherein said roll frame positions said roll ahead of said pressing wheel axis with respect to said path.

5. A machine as defined in claim 1, additionally including ground-engaging wheels mounted on said main frame and adapted to carry a major portion of the weight of said machine.

6. A machine for laying agricultural film, including a main frame, film-pressing wheels mounted substantially coaxially on opposite sides of said main frame, film roll supporting means adapted to position a roll of film so that film withdrawn from said roll is engaged by said pressing wheels as said machine proceeds along a path over ground, furrow-opening means disposed ahead of said film-pressing wheels, and furrow-closing means disposed behind said film-pressing wheels with respect to said path, wherein the improvement comprises:
    a plurality of film-supporting arches aligned along said path and disposed transversely thereto, and a central elongated cantilever film-elevating member mounted on said frame ahead of said film-pressing wheels and extending rearwardly with respect to said path, said cantilever member being disposed to engage said film as it is deposited to temporarily elevate said film over said arches.

7. A machine for laying agricultural film, including a main frame, film-pressing wheels mounted substantially coaxially on opposite sides of said main frame, film roll supporting means adapted to position a roll of film so that film withdrawn from said roll is engaged by said pressing wheels as said machine proceeds along a path over ground, furrow-opening means disposed ahead of said film-pressing wheels, and furrow-closing means disposed behind said film-pressing wheels with respect to said path, wherein the improvement comprises:
    a form of said film roll supporting means which includes said film-pressing wheels; and
    a central elongated cantilever film-elevating member mounted on said frame ahead of said film-pressing wheels and extending rearwardly with respect to said path, said cantilever member being disposed to engage said film as said film is deposited to elevate the central portion of said film.

* * * * *